No. 662,496.  
J. C. PEDEN.  
CARBURETER.  
(Application filed Mar. 24, 1900.)  
Patented Nov. 27, 1900.
(No Model.)
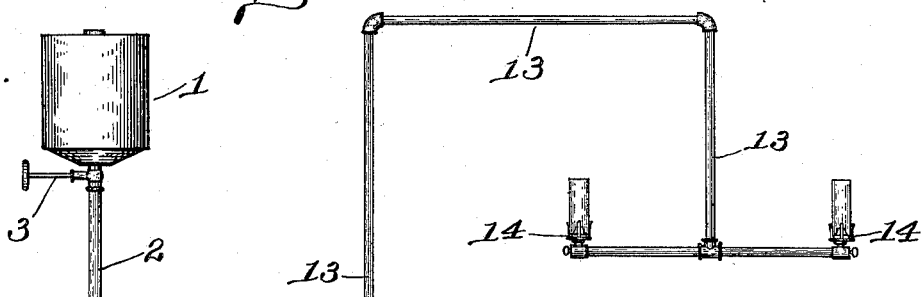
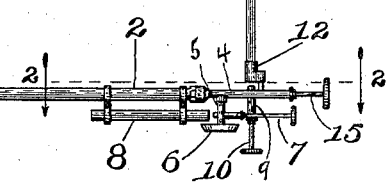
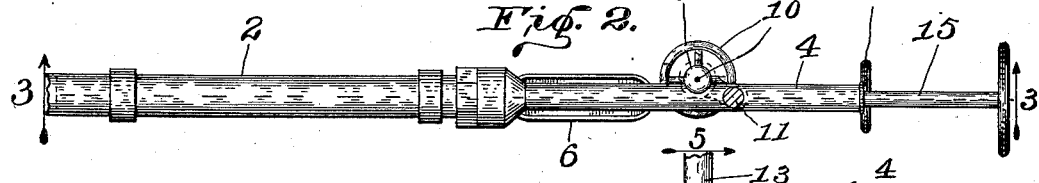
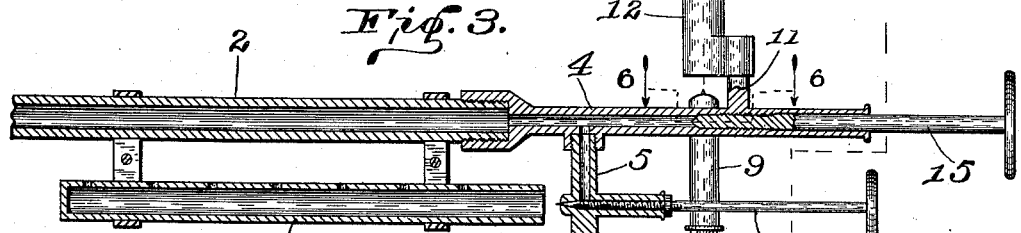
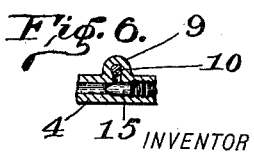
WITNESSES:
C. S. Frye
J. A. Walsh
INVENTOR
Joseph C. Peden,
BY
Chester J. Bradford,
ATTORNEY.
THE NORRIS PETERS CO., PHOTO-LITHO., WASHINGTON, D. C.

UNITED STATES PATENT OFFICE.

JOSEPH CLARK PEDEN, OF NEW ALBANY, INDIANA, ASSIGNOR TO THE ALADDIN INCANDESCENT GAS LAMP COMPANY, OF SAME PLACE.

CARBURETER.

SPECIFICATION forming part of Letters Patent No. 662,496, dated November 27, 1900.

Application filed March 24, 1900. Serial No. 10,038. (No model.)

*To all whom it may concern:*

Be it known that I, JOSEPH CLARK PEDEN, a citizen of the United States, residing at New Albany, in the county of Floyd and State of Indiana, have invented certain new and useful Improvements in Gasolene-Gas Generators, of which the following is a specification.

My present invention relates to an apparatus for producing light by means of a gasolene-gas.

The objects of said invention are to produce a continuous flow of gas and to provide facilities for the proper adjustment of the lights. These objects are accomplished by a peculiar construction and arrangement of parts, as will be hereinafter more particularly described and claimed.

Referring to the accompanying drawings, which are made a part hereof, and on which similar reference characters indicate similar parts, Figure 1 is a side elevation of an apparatus embodying my said invention; Fig. 2 a, horizontal sectional view, on an enlarged scale, of those portions to which my invention particularly relates as seen when looking in the direction indicated by the arrows from the dotted line 2 2 in Fig. 1; Fig. 3, a vertical sectional view as seen from the dotted line 3 3 in Fig. 2; Fig. 4, a transverse sectional view as seen from the dotted line 4 4 in Fig. 3; Fig. 5, a similar view as seen from the dotted line 5 5 in Fig. 3, and Fig. 6 a small detail or fragmentary view as seen from the dotted line 6 6 in Fig. 3.

The gasolene from which the gas used in my apparatus is produced is contained in a suitable reservoir 1, from which a pipe 2 leads to the point of generation. A valve 3 in said pipe 2, preferably near the reservoir 1, is provided for the purpose of shutting off the supply when desired. The pipe 2 at the point where the gas is generated extends in a horizontal position. Extending out from the end of the pipe 2 is a tubular attachment 4, which is substantially a prolongation of the pipe 2, and which serves first as a primary generating tube or chamber and afterward as a gas-conductor leading to the points of consumption. Depending from this part 4 is a branch 5, upon or connected to the bottom of which is a shallow pan 6. At the bottom of the orifice in the branch 5 and above the top of the pan 6 is a valve 7, which has a needle-point extending through a tiny perforation in the side of said part 5. Opposite the valve 7 is a generating-burner 8, arranged in such relation to the valve 7 that the center thereof is opposite the needle-point of said valve. This burner 8 is tubular in form, with one end closed and numerous perforations in its upper side, as shown most plainly in Fig. 3. At a point beyond the branch 5 is another branch 9, containing a valve 10, which also has a needle-point, this valve, however, being arranged vertically, so that the needle-point extends directly upwardly. Supported by a standard 11 is a mixer 12, which is coupled onto the gas-pipe 13, which leads to the point of consumption, as the burners 14. In the outer end of the part 4 is a shut-off valve 15.

In operation the valve 7 is first opened slightly, when the gasolene will run out through the fine perforation in the branch 5 into the pan 6. When the pan 6 is nearly filled, the valve 7 is closed and the contents of the pan set on fire. The flame from this is sufficient to generate a small quantity of gas in the branch 5 and part 4 sufficient to start the apparatus regularly into operation. After the gas has thus been generated the valve 7 is reopened, when the gas which has been generated under the pressure exerted by the gasolene behind it in the pipe 2 and in the tank 1 will shoot out of the fine perforation in the branch 5 and enter the burner 8, where, it being ignited, it will pass out through the perforations in the upper side of said burner against that portion of the pipe 2 immediately above it and will generate gas therein. When it is desired to use the gas for light, the valve 15 is opened, and the valve 10 is opened just sufficiently to permit the required quantity of gas to pass, which will pass up through the fine perforation in the branch 9 (at the point of the valve 10) into the mixer 12, and whence with a suitable quantity of atmospheric air will pass up the pipe 13 and thence to the burners 14. The purpose of the valve 10 is to accurately adjust the quantity of gas to the requirements of the lights. If only one or two lights are to be burned, the opening will be very small. If a larger number of lights are to be burned, then the opening will be proportionally greater.

The gas generated in the pipe 2 under the flame from the burner 8 is sufficient both to supply the lights and to supply said burner with fuel to keep up the generation.

While I have illustrated and described my apparatus as applicable to a device for furnishing light, I desire it to be understood that the pipe 13, leading from the mixer 12 and the burners 14, may be any conduit and any consuming device with which my invention may be desired to be used, whether for lighting, heating, or otherwise.

Having thus fully described my said invention, what I claim as new, and desire to secure by Letters Patent, is—

The combination, in an apparatus for producing gasolene-gas, of a reservoir, a pipe leading therefrom having a horizontal portion, a burner arranged beneath said horizontal portion, a branch extending from said pipe beyond said burner and provided with a pan on its lower end, a valve in said pipe the point of which is arranged opposite the open end of said burner, a second branch beyond the first containing a regulating-valve, a shut-off valve arranged to open and close the orifice leading to said branch, a mixer arranged directly above the point of the regulating-valve, and a pipe leading therefrom to the point of consumption.

In witness whereof I have hereunto set my hand and seal at New Albany, Indiana, this 21st day of March, A. D. 1900.

JOSEPH CLARK PEDEN. [L. S.]

Witnesses:
HENRY E. JEWETT,
WILLIAM O. VANCE.